A. O. DEAN.
Gate.

No. 221,536. Patented Nov. 11, 1879.

WITNESSES:
C. Neveux
C. Sedgwick

INVENTOR:
A. O. Dean
BY Munn & Co
ATTORNEYS.

UNITED STATES PATENT OFFICE.

ALONZO O. DEAN, OF BETHEL, VERMONT.

IMPROVEMENT IN GATES.

Specification forming part of Letters Patent No. 221,536, dated November 11, 1879; application filed May 15, 1879.

*To all whom it may concern:*

Be it known that I, ALONZO O. DEAN, of Bethel, in the county of Windsor and State of Vermont, have invented a new and Improved Gate, of which the following is a specification.

The object of this invention is to increase the strength and durability of the gate-post, to brace the gate in its hanging, and to enable it to close itself after being opened.

It consists in connecting the gate-post with an iron socket sunk into the ground and braced by extending arms; also, in hanging the gate on rollers pivoted in a frame attached to the post; also, in providing the gate with a ratchet-bar, which engages a toothed wheel connected with a helical spring, which, when the gate is opened, is wound up, and, in retracting, closes the gate.

Figure 1:
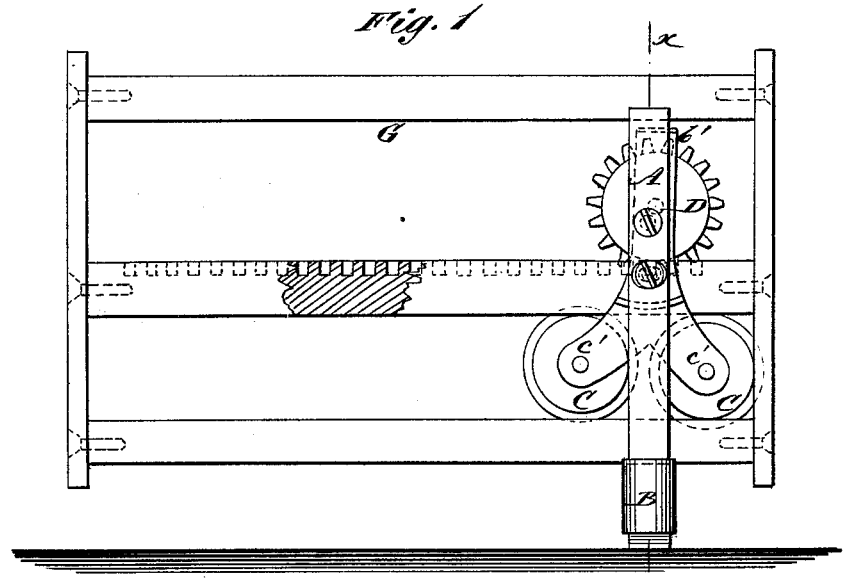
Figures 2, 3:
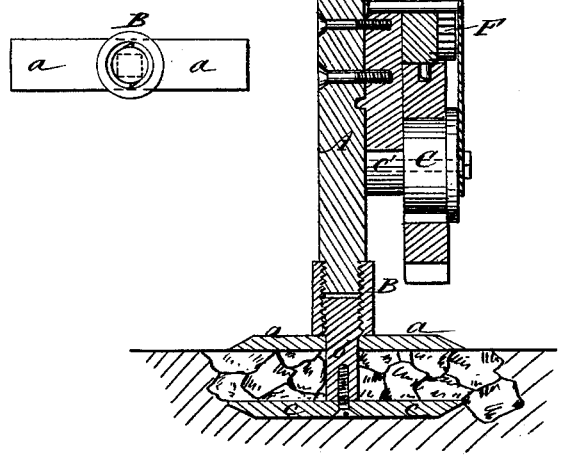
Figure 4:
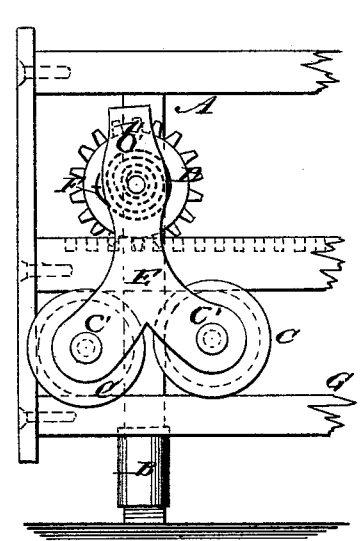

In the accompanying drawings, Figure 1 is an elevation of one side of the gate. Fig. 2 is a vertical cross-section on line $xx$, Fig. 1. Fig. 3 is an elevation of the opposite side of the gate from Fig. 1, and Fig. 4 is a top view of the socket for the gate-post.

Similar letters of reference indicate corresponding parts.

Referring to the drawings, A is the gate-post, screwed into the metal socket B. This socket has right-angular arms $a\ a$ extending from it, which rest upon the surface of the ground, and provided with an extension, $b$, with arms $c\ c$ on its lower end, which extension can be made in a separate piece and screwed into the said socket, as shown, or it can be made an integral part of the said socket. These latter arms and the extension $b$ are let into the ground and tamped with stones or earth.

Arms $a\ a$ rest on the surface, and the two prevent the post from sagging, while by connecting the post with the socket it is preserved from contact with the earth, and thus is not so subject to decay, and its durability is greatly increased.

On one side of the post A is fixed a frame with three arms, $b'\ c'\ c'$, the first above and the two latter below. In these are pivoted rollers C C, with flanges on the outside, and in arm $b$ is pivoted a toothed wheel, D.

A metal cap, E, is connected by its upper end to the top of arm $b'$, and is thence carried over the toothed wheel and down to wheels C C. This cap furnishes an outside bearing for the pivots of the wheels.

F is a helical spring, one end whereof is fixed to the toothed wheel, while the other is attached to the pivot on which said wheel turns.

G is the gate, the middle bar whereof is placed on the wheels C C, inside the flanges, and thus supports the gate, while the upper side of said bar is provided with ratchet-teeth, which engage the toothed wheel.

The wheels C C furnish an even bearing or hanging for the gate, and on them it can be run back and forth to open and close the gateway easily, and they maintain it perfectly level.

When the gate is run back, the ratchet, engaging the toothed wheel, turns it and winds the spring tightly, so that when the gate is released from the pressure of opening the retraction of the spring exerts a force that turns the toothed wheel, and this, through the ratchet, moves the gate and closes it quickly.

The rollers or wheels C C may be used alone as a hanging for the gate and to facilitate the opening and closing of it; or they may be used in connection with the toothed wheel and spring, as described.

Having thus described my invention, I claim as new and desire to secure by Letters Patent—

1. As an improvement in gates, the metal socket B, with arms $a\ a$, and extension $b$, having arms $c\ c$, in combination with the gate-post A and gate G, to give a firm and durable connection of the post with the ground, substantially as described.

2. The flanged wheels C C, pivoted to the arms $c'\ c'$ of the frame attached to the post, in combination with the gate, the middle bar whereof is hung on the wheels C C, and thus supports the gate, and enables it to be easily opened and closed, substantially as described.

3. In combination with the flanged rollers C C and gate G, with ratchet middle bar, the toothed wheel D, pivoted in arm $b'$, and spring F, connected to the wheel, and the pivot thereof, whereby, when the gate is opened, the ratchet-bar turns the toothed wheel and winds the spring, which, retracting, closes the gate, in the manner substantially as described.

4. The metal cap E, connected at its upper end with the top of arm $b'$, and passed outside the gate to arms $c'$ $c'$, for the purpose of furnishing an outside bearing for the pivots of wheels C C and toothed wheel D, substantially as described.

ALONZO O. DEAN.

Witnesses:
M. A. MOODY,
A. J. DAVIS.